(12) United States Patent
Muraguchi et al.

(10) Patent No.: US 11,293,509 B2
(45) Date of Patent: Apr. 5, 2022

(54) REBOUND SPRING STRUCTURE (71) Applicant: SHOWA CORPORATION, Gyoda (JP)

(72) Inventors: Nobuyuki Muraguchi, Gyoda (JP); Takao Yamamoto, Gyoda (JP); Naoki Senou, Gyoda (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 349 days.

(21) Appl. No.: 16/332,566

(22) PCT Filed: Jan. 16, 2017

(86) PCT No.: PCT/JP2017/001260
§ 371 (c)(1),
(2) Date: Mar. 12, 2019

(87) PCT Pub. No.: WO2018/078896
PCT Pub. Date: May 3, 2018

(65) Prior Publication Data
US 2021/0190164 A1    Jun. 24, 2021

(30) Foreign Application Priority Data
Oct. 31, 2016  (JP) .............................. JP2016-213218

(51) Int. Cl.
*F16F 1/12*    (2006.01)
*F16F 9/58*    (2006.01)

(52) U.S. Cl.
CPC .............. *F16F 1/125* (2013.01); *F16F 1/127* (2013.01); *F16F 9/585* (2013.01)

(58) Field of Classification Search
CPC .. F16F 1/125; F16F 1/126; F16F 1/127; F16F 9/58; F16F 9/585
See application file for complete search history.

(56) References Cited

U.S. PATENT DOCUMENTS 4,838,393 A * 6/1989 Mourray ................. F16F 7/082
                                                      188/284
6,220,406 B1 * 4/2001 de Molina .............. F16F 9/464
                                                      188/275
(Continued)

FOREIGN PATENT DOCUMENTS

CN    101846152 A    9/2010
CN    203641371 U    6/2014
(Continued)

OTHER PUBLICATIONS

EPO machine translation DE 10 2006 005 621 B4. (Year: 2012).*
(Continued)

*Primary Examiner* — Thomas J Williams
(74) *Attorney, Agent, or Firm* — Leason Ellis LLP (57) ABSTRACT

The rebound spring structure includes: a rebound spring; a lower rebound collar configured to hold an end on one side of the rebound spring; and an upper rebound collar configured to hold an end on the other side of the rebound spring, the rebound spring structure being positioned around a rod configured to move relative to a cylinder. The lower rebound collar is held by a piston rod. The upper rebound collar is movably fitted to the piston rod. The upper rebound collar includes a recess on an upper disk part configured to restrict movement of the rebound spring to the other side, the recess being configured to facilitate movement of the upper rebound collar in a circumferential direction of the piston rod.

10 Claims, 11 Drawing Sheets

(56) References Cited

U.S. PATENT DOCUMENTS

| | | | | |
|---|---|---|---|---|
| 2007/0138721 A1* | 6/2007 | Handke | ............... | F16F 9/585 267/219 |
| 2009/0107781 A1* | 4/2009 | Fritz | ................. | F16F 9/585 188/280 |
| 2010/0236882 A1 | 9/2010 | Uchiyama | | |
| 2012/0248670 A1* | 10/2012 | Yamashita | ............. | F16F 9/585 267/226 |
| 2015/0247547 A1* | 9/2015 | Yamashita | ................ | F16F 9/32 188/313 |
| 2016/0185177 A1 | 6/2016 | Kaneko et al. | | |
| 2018/0038442 A1* | 2/2018 | Adick | ................... | F16F 9/585 |
| 2021/0190164 A1* | 6/2021 | Muraguchi | ............ | F16F 1/127 |

FOREIGN PATENT DOCUMENTS

| | | | | |
|---|---|---|---|---|
| CN | 105518335 A | | 4/2016 | |
| DE | 4243645 A1 * | | 6/1994 | ............. F16F 1/127 |
| DE | 102010028536 A1 * | | 11/2011 | ............. F16F 9/585 |
| DE | 102006005621 B4 * | | 1/2012 | ............. F16F 9/585 |
| DE | 102013207130 A | | 10/2014 | |
| GB | 2086004 A * | | 5/1982 | ............. F16F 1/127 |
| JP | 2001-193782 A | | 7/2001 | |
| JP | 2006177531 A | | 7/2006 | |
| JP | 2008-051246 A | | 3/2008 | |
| JP | 2010-038313 A | | 2/2010 | |
| JP | 2014-114872 A | | 6/2014 | |
| WO | WO-2016131725 A1 * | | 8/2016 | ............. F16F 9/585 |

OTHER PUBLICATIONS

EPO machine translation, DE 10 2010 028 536 A1. (Year: 2011).*
International Search Report dated Feb. 21, 2017 for the corresponding PCT Application No. PCT/JP2017/001260.
German Office Action dated Feb. 24, 2021 for the corresponding German Patent Application No. 112017005504.0.

* cited by examiner

REBOUND SPRING STRUCTURE

CROSS-REFERENCE TO RELATED PATENT APPLICATIONS

This application is a U.S. National Phase Application under 35 U.S.C. § 371 of International Patent Application No. PCT/JP2017/001260, filed Jan. 16, 2017, and claims the benefit of Japanese Patent Application No. 2016-213218, filed Oct. 31, 2016, all of which are incorporated herein by reference in their entirety. The International Application was published in Japanese on May 3, 2018 as International Publication No. WO/2018/078896 under PCT Article 21(2).

FIELD OF THE INVENTION

The present invention relates to a rebound spring structure.

BACKGROUND OF THE INVENTION

A rebound spring for absorbing shock during maximum extension of a hydraulic shock absorber has been proposed. For example, Japanese Unexamined Publication No. 2010-038313 discloses a rebound spring including: cylinder, a piston rod movably inserted into the cylinder via a piston, a rod guide mounted to one end of the cylinder and rotatably supporting the piston rod; and a flange provided on an outer periphery of the piston rod. In the shock absorber, the rebound spring is interposed between the rod guide and the flange. The rebound spring includes: a coil spring; an annular flange-side holder provided to a flange-side end of the coil spring and loosely fitted to the outer periphery of the piston rod; and a guide-side holder provided to a rod guide-side end of the coil spring and allowing for insertion of the piston rod. An elastic ring is attached to an inner periphery of the flange-side holder for fitting to the outer periphery of the piston rod, and the flange-side holder is fixed to the outer periphery of the piston rod by tightening force of the elastic ring.

Technical Problem

When one end of the rebound spring is fixed, for example, relative rotation of the piston rod and the cylinder during maximum contraction of the rebound spring may cause the one end and the other end of the rebound spring to rotate relative to each other and twist. This may result in plastic deformation of the rebound spring.

An object of the present invention is to provide a rebound spring structure that prevents plastic deformation of the rebound spring.

SUMMARY OF THE INVENTION

Solution to Problem

With this object in view, the present invention is a rebound spring structure including: a spring; a one-side holding member configured to hold an end on one side of the spring; and an other-side holding member configured to hold an end on the other side of the spring, the rebound spring structure being positioned around a rod configured to move relative to a cylinder, wherein the one-side holding member is held by the rod, the other-side holding member is movably fitted to the rod, and the other-side holding member includes a facilitating part at a flange of the other-side holding member, the flange being configured to restrict movement of the spring to the other side, the facilitating part being configured to facilitate movement of the other-side holding member in a circumferential direction of the rod.

Advantageous Effects of Invention

According to the present invention, it is possible to provide a rebound spring structure that prevents plastic deformation of the rebound spring.

DETAILED DESCRIPTION OF THE INVENTION

Hereinafter, embodiments of the present invention will be explained in detail with reference to the accompanying drawings.

Figure 1:
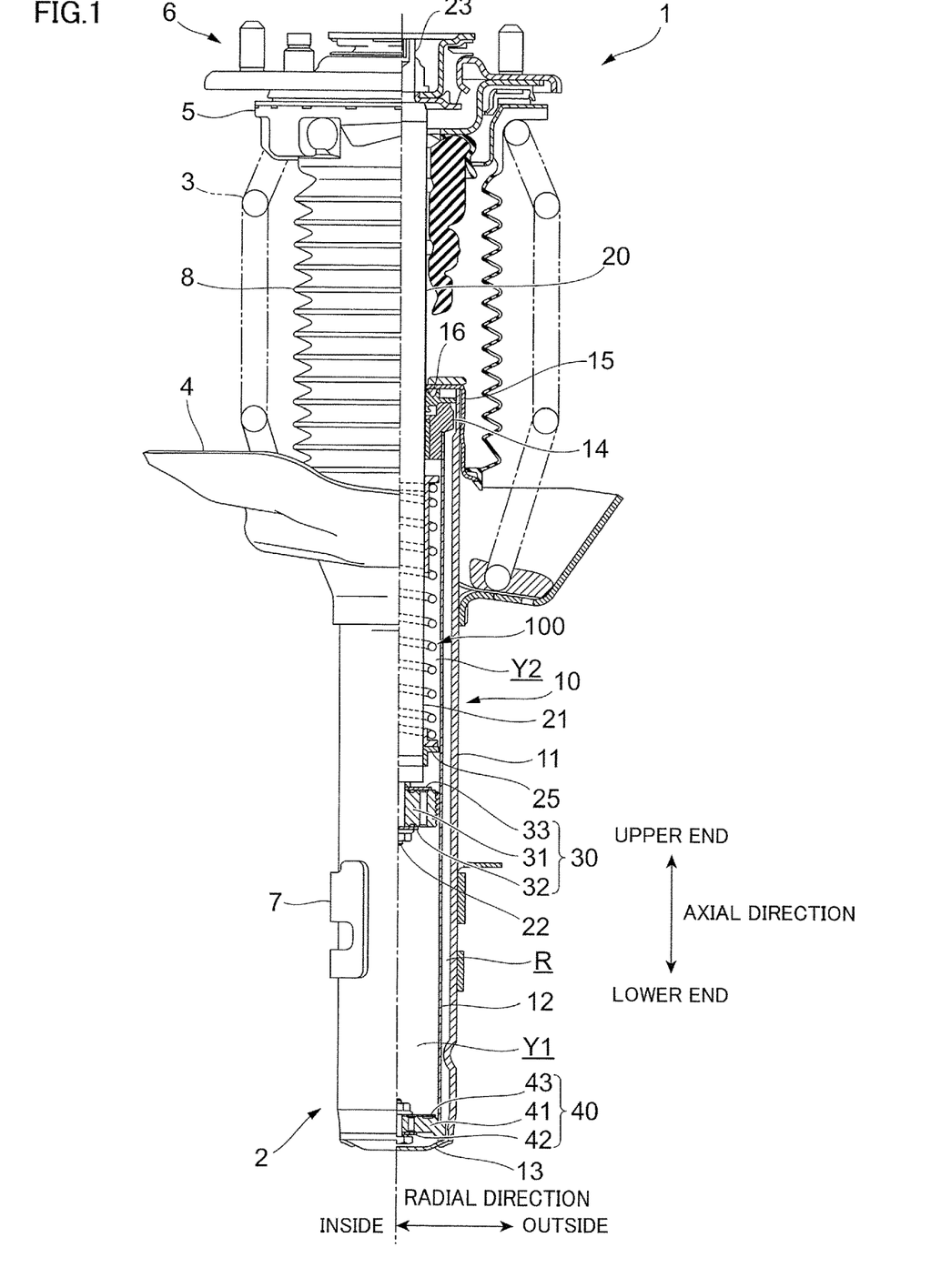
FIG. 1 illustrates a schematic configuration of a suspension device to which a rebound spring unit of embodiments is applied.

FIG. 1 illustrates a schematic configuration of a suspension device 1 to which a rebound spring unit of embodiments of the present invention is applied.

The suspension device 1 is a strut type suspension. As shown in FIG. 1, the suspension device 1 includes a hydraulic shock absorber 2 and a coil spring 3 positioned outside of the hydraulic shock absorber 2. The suspension device 1 further includes a lower spring seat 4 that supports one end (lower end in FIG. 1) of the coil spring 3, and an upper spring seat 5 that supports the other end (upper end in FIG. 1) of the coil spring 3.

Further, the suspension device 1 includes a vehicle body-side mounting bracket 6 attached to the other end of a piston rod 20 (described later) to mount the suspension device 1 to the vehicle, a wheel-side mounting bracket 7 fixed to one end of a cylinder part 10 (described later) to mount the suspension device 1 to the wheel, and a dust cover 8 covering at least a part of the cylinder part 10 and the piston rod 20.

The hydraulic shock absorber 2 will be described in detail below.

As shown in FIG. 1, the hydraulic shock absorber 2 is a multi-cylinder hydraulic shock absorber and includes the cylinder part 10, the piston rod 20, a piston valve 30, and a bottom valve 40. The hydraulic shock absorber 2 further includes a rebound spring unit 100 that absorbs shock when the piston rod 20 extends.

Cylinder Part 10

The cylinder part 10 includes a thin cylindrical outer cylinder 11, a thin cylindrical inner cylinder 12 accommodated in the outer cylinder 11, and a bottom lid 13 that closes one end (lower end in FIG. 1) in a centerline direction (vertical direction in FIG. 1) of the cylindrical outer cylinder 11. The outer cylinder 11 is filled with oil. In the following explanations, the centerline direction of the outer cylinder 11 may be called an "axial direction". Also, one side in the centerline direction may be called a "lower" side and the other side in the centerline direction may be called an "upper" side. Further, the side radially closer to the centerline may be called an "inside", and the side opposite to the side closer to the centerline may be called an "outside".

The cylinder part 10 includes a rod guide 14 and a bump stopper cap 15. The rod guide 14, which is an example of the support member, is disposed inside the outer cylinder 11 to close an upper end of the inner cylinder 12 and movably (slidably) support the piston rod 20. The bump stopper cap 15 is fitted to an upper end of the outer cylinder 11. The cylinder part 10 further includes, in an upper part of the outer cylinder 11, an oil seal 16 to prevent leakage of oil from the outer cylinder 11 and entry of foreign materials into the outer cylinder 11.

The cylinder part 10 forms a reservoir chamber R between an outer surface of the inner cylinder 12 and an inner surface of the outer cylinder 11.

Piston Rod 20

The piston rod 20 is a solid or hollow rod-like member, and includes a columnar or cylindrical rod part 21. The piston rod 20 further includes a lower mounting part 22 at the lower end for fixing the piston valve 30, and an upper mounting part 23 at the upper end for fixing the hydraulic shock absorber 2 to the vehicle body and the like. A male screw is formed in an end of each of the lower mounting part 22 and the upper mounting part 23.

The piston rod 20 is provided with a rebound seat 25. The rebound seat 25 is formed of iron and fixed to the piston rod 20 by welding or any other method.

Piston Valve 30

The piston valve 30 includes a piston 31, a lower group of valves 32, and an upper group of valves 33. The lower group of valves 32 closes lower ends of some oil passages among multiple oil passages formed in the piston 31. The upper group of valves 33 closes upper ends of some oil passages formed in the piston 31.

The piston 31 contacts the inner surface of the inner cylinder 12 via a seal member provided on an outer surface of the piston 31, and partitions a space of the inner cylinder 12 containing oil into a first oil chamber Y1 below the piston 31 and a second oil chamber Y2 above the piston 31 (see FIG. 1).

Bottom Valve 40

As shown in FIG. 1, the bottom valve 40 includes a valve body 41 having multiple oil passages penetrating in the axial direction, a lower valve 42 provided below the valve body 41, and an upper valve 43 provided above the valve body 41.

The valve body 41 of the bottom valve 40 separates the first oil chamber Y1 from the reservoir chamber R.

Rebound Spring Unit 100

First Embodiment

Figure 2:
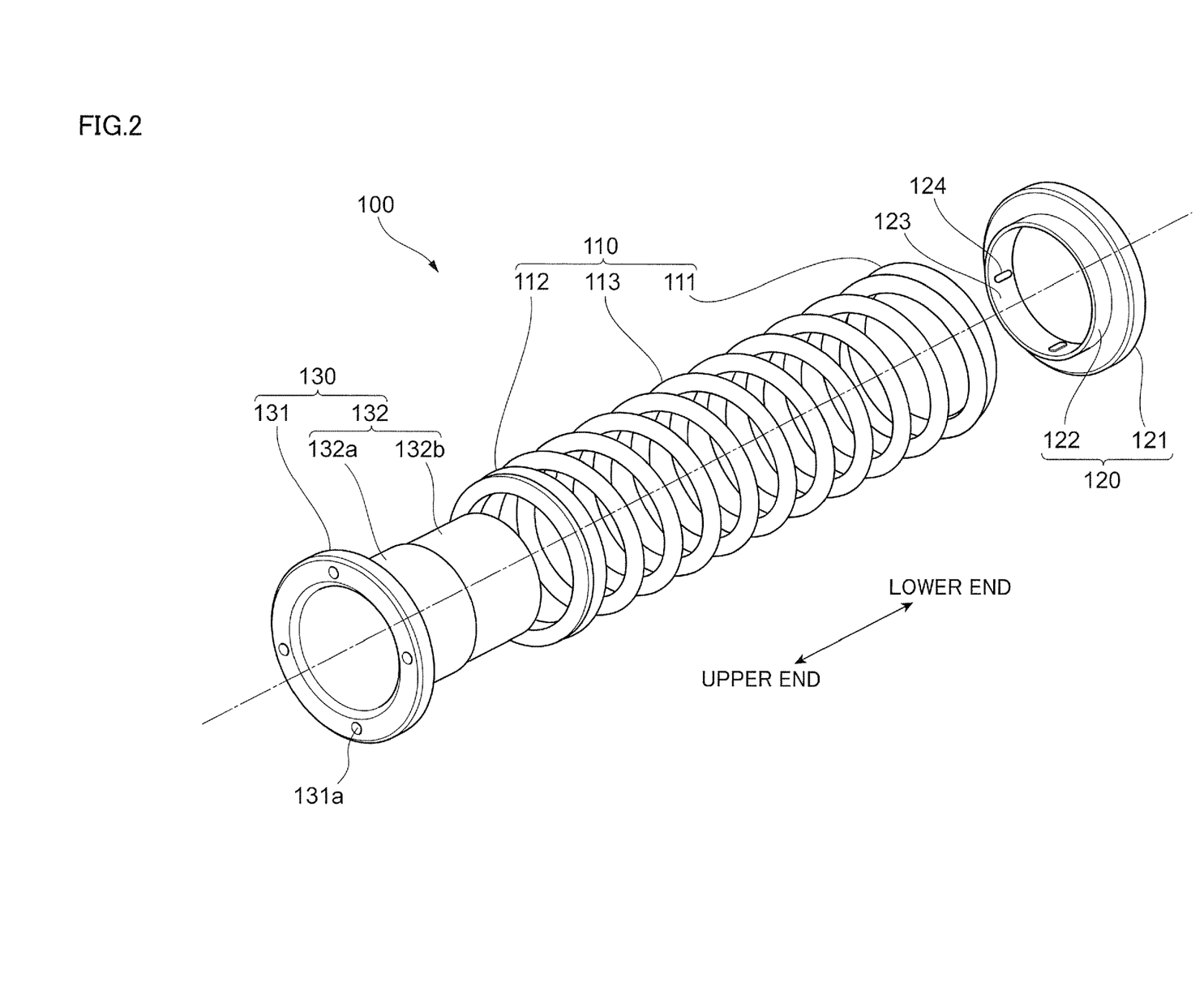
FIG. 2 illustrates a schematic configuration of the rebound spring unit of the first embodiment.

FIG. 2 illustrates a schematic configuration of the rebound spring unit 100 of the first embodiment.

Figure 3:
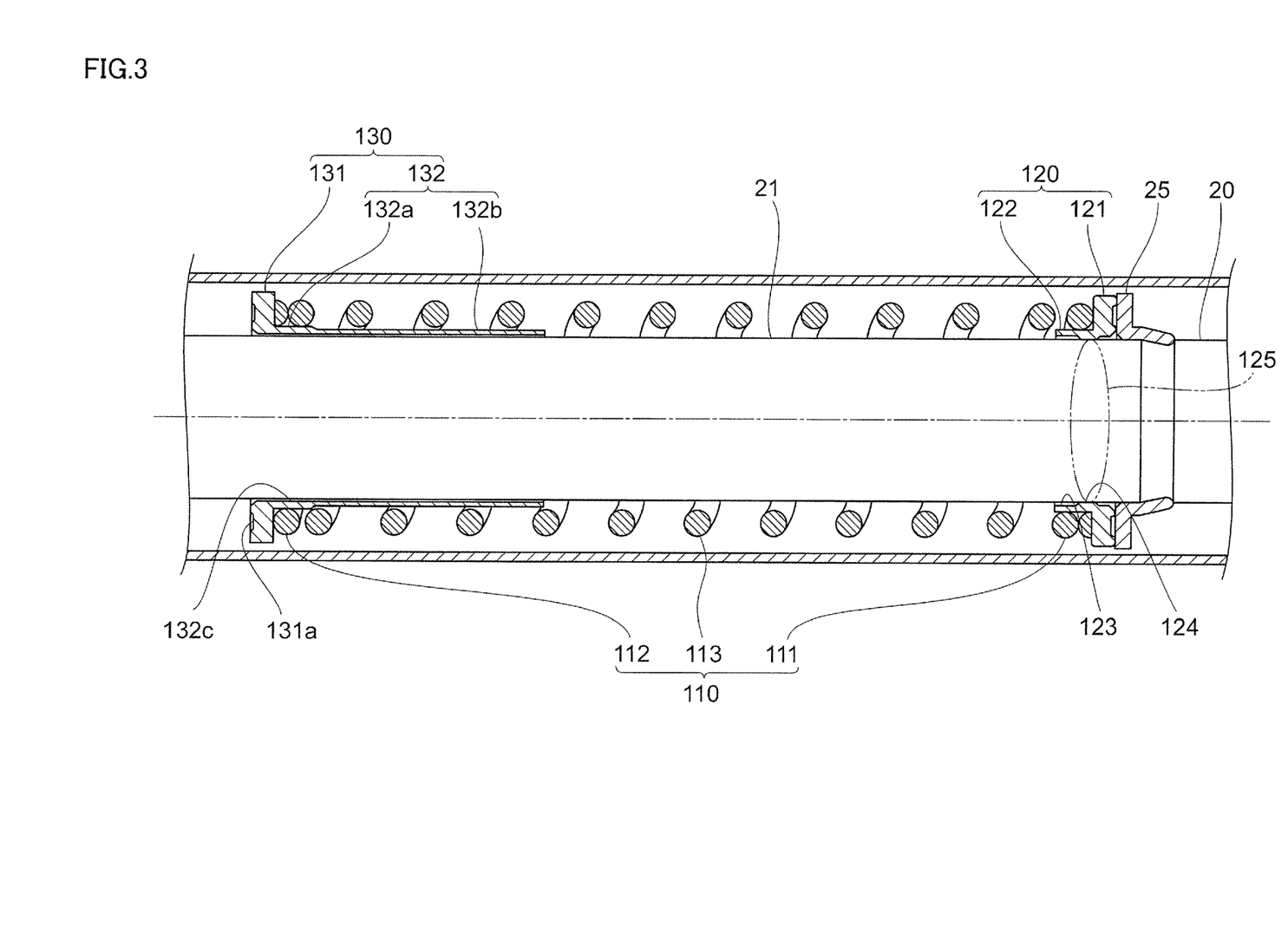
FIG. 3 is a cross-sectional view of the rebound spring unit of the first embodiment.

FIG. 3 is a cross-sectional view of the rebound spring unit 100 of the first embodiment.

The rebound spring unit 100 of the first embodiment includes a rebound spring 110 positioned around the piston rod 20, a lower rebound collar 120 holding a lower end of the rebound spring 110, and an upper rebound collar 130 holding an upper end of the rebound spring 110.

The rebound spring unit 100 is positioned between the rebound seat 25 fixed to the piston rod 20 and the rod guide 14 (see FIG. 1).

Rebound Spring 110

The rebound spring 110 is a coil spring and includes a lower end coil 111 that is an end coil formed at the lower end, an upper end coil 112 that is an end coil formed at the upper end, and an expansion part 113 that is formed between the lower end coil 111 and the upper end coil 112 to expand and contract.

Each of the lower end coil 111 and the upper end coil 112 is formed of a closely wound wire. Thus, the total number of turns of the rebound spring 110 equals the sum of the number of turns of the expansion part 113, which is the number of active turns, the number of turns of the lower end coil 111 and the number of turns of the upper end coil 112.

Lower Rebound Collar 120

The lower rebound collar 120 includes a lower disk part 121 of a disk-like shape and a lower cylindrical part 122 of a cylindrical shape. Formed at the central portion of the lower disk part 121 is a through-hole to allow for insertion of the piston rod 20.

A lower inner surface 123, which is an inner surface of the lower cylindrical part 122, has a larger diameter than a diameter of an outer surface of the rod part 21 of the piston rod 20. The lower inner surface 123 includes multiple (four in the present embodiment) protrusions 124 arranged at equal intervals in a circumferential direction and protruding inwardly. A virtual circle 125 defined by respective tips of the multiple protrusions 124 has a smaller diameter than the outer diameter of the rod part 21 of the piston rod 20. The lower rebound collar 120 is inserted relative to the piston rod 20 until the lower disk part 121 contacts the rebound seat 25 fixed to the piston rod 20. In other words, since the virtual circle 125 defined by the respective tips of the multiple protrusions 124 protruding inwardly from the lower inner surface 123 has a smaller diameter than the outer diameter of the rod part 21 of the piston rod 20, the lower rebound collar 120 is press-fitted to the piston rod 20 until the lower disk part 121 contacts the rebound seat 25.

The lower cylindrical part 122 has a larger outer diameter than an inner diameter of the rebound spring 110. The lower cylindrical part 122 of the lower rebound collar 120 is inserted inside the rebound spring 110 until the lower disk part 121 contacts the lower end of the rebound spring 110. In other words, since the lower cylindrical part 122 has a larger outer diameter than the inner diameter of the rebound spring 110, the lower rebound collar 120 is press-fitted into the rebound spring 110 until the lower disk part 121 contacts the lower end of the rebound spring 110. A length of the lower cylindrical part 122 in the axial direction is set substantially same as a length of the lower end coil 111 of the rebound spring 110. Thus, the lower rebound collar 120 holds the rebound spring 110.

Upper Rebound Collar 130

The upper rebound collar 130 includes an upper disk part 131 of a disk-like shape and an upper cylindrical part 132 of a cylindrical shape. Formed at the central portion of the upper disk part 131 is a through-hole to allow for insertion of the piston rod 20.

The upper disk part 131 includes recesses 131a receding from an upper surface of the upper disk part 131 facing the rod guide 14. Each recess 131a may have a hemispherical shape or a trapezoidal cross-section. Multiple (e.g., four) recesses 131a are arranged at equal intervals in the circumferential direction.

The upper cylindrical part 132 includes a first cylindrical part 132a on an upper side (the upper disk part 131 side) and a second cylindrical part 132b on a lower side. The first cylindrical part 132a and the second cylindrical part 132b have the same inner diameter, and the combination of the first cylindrical part 132a and the second cylindrical part 132b defines an upper inner surface 132c. The upper inner surface 132c has a larger diameter than the outer diameter of the rod part 21 of the piston rod 20. Thus, the upper rebound collar 130 is movable relative to the piston rod 20 while being positioned around the piston rod 20.

The first cylindrical part 132a has a larger outer diameter than an outer diameter of the second cylindrical part 132b. The outer diameter of the first cylindrical part 132a is larger than the inner diameter of the rebound spring 110, and the outer diameter of the second cylindrical part 132b is smaller than the inner diameter of the rebound spring 110. The upper cylindrical part 132 of the upper rebound collar 130 is inserted inside the rebound spring 110 until the upper disk part 131 contacts the upper end of the rebound spring 110. In other words, since the first cylindrical part 132a has the larger outer diameter than the inner diameter of the rebound spring 110, the upper rebound collar 130 is press-fitted into the rebound spring 110 until the upper disk part 131 contacts the upper end of the rebound spring 110. A length of the first cylindrical part 132a in the axial direction is set substantially same as a length of the upper end coil 112 of the rebound spring 110. Thus, the upper rebound collar 130 holds the rebound spring 110.

Functions of the Rebound Spring Unit 100

Figure 4A:
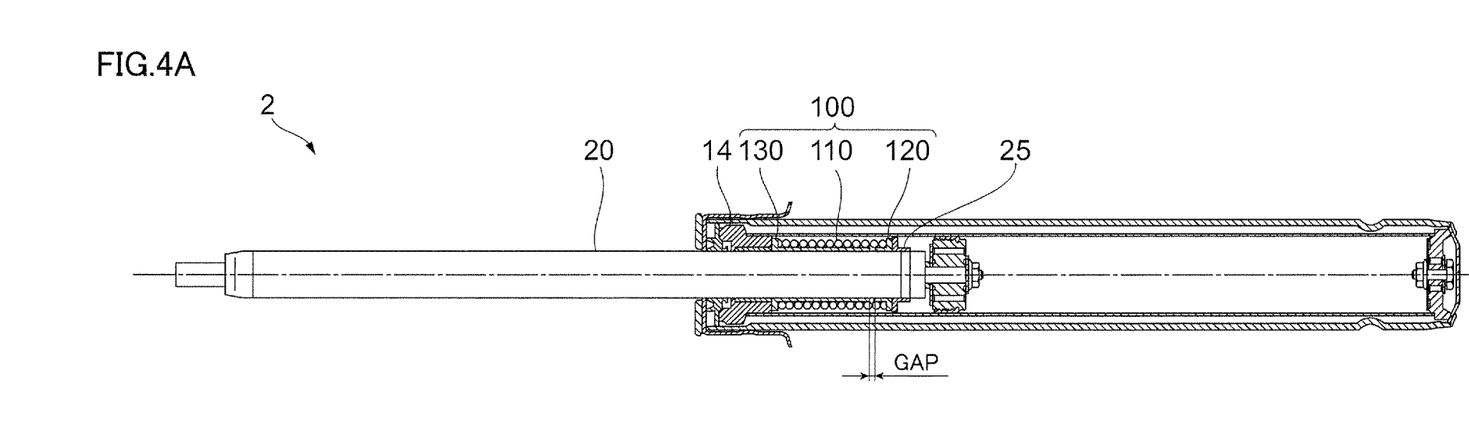
FIG. 4A is a cross-sectional view of a hydraulic shock absorber in a state where a projection amount of a piston rod from a cylinder part is maximum and FIG. 4B is a cross-sectional view of the hydraulic shock absorber in a state where the projection amount of the piston rod from the cylinder part is minimum.
Figure 4B:
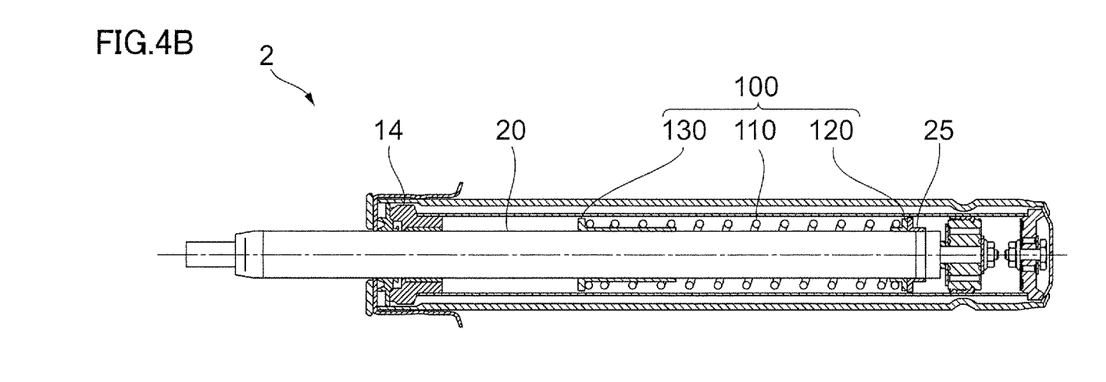

FIG. 4A is a cross-sectional view of the hydraulic shock absorber 2 in a state where a projection amount of the piston rod 20 from the cylinder part 10 is maximum. FIG. 4B is a cross-sectional view of the hydraulic shock absorber 2 in a state where the projection amount of the piston rod 20 from the cylinder part 10 is minimum.

As shown in FIG. 4A, when the projection amount of the piston rod 20 is maximum, the upper rebound collar 130 contacts the rod guide 14, and the rebound spring 110 comes to the most contracted state, in other words the state where the rebound spring 110 is most closely wound. Contraction of the rebound spring 110 allows the rebound spring 110 to absorb a shock even when the projection amount of the piston rod 20 suddenly increases due to, for example, a recess on a road surface where the vehicle is travelling. The lower rebound collar 120 and the upper rebound collar 130 are set to have a length such that the lower rebound collar 120 and the upper rebound collar 130 do not contact each other even when the rebound spring 110 is in the most contracted state.

As shown in FIG. 4B, when a length of the piston rod 20 between the rebound seat 25 fixed to the piston rod 20 and the rod guide 14 is longer than a length of the rebound spring unit 100 in its uncontracted state, the upper rebound collar 130 does not contact the rod guide 14.

The rebound spring unit 100 of the first embodiment configured as above has a rebound spring structure including the rebound spring 110, the lower rebound collar 120 and the upper rebound collar 130. The rebound spring unit 100 includes: the rebound spring 110, which is an example of the spring, positioned around the piston rod 20 moving relative to the cylinder part 10; and the lower rebound collar 120, which is an example of the one-side holding member, holding the one (lower) end of the rebound spring 110 and held by the piston rod 20. The rebound spring unit 100 further includes the upper rebound collar 130, which is an example of the other-side holding member, holding the other (upper) end of the rebound spring 110 and fitted to the piston rod 20 so as to be movable relative to the piston rod 20. The upper rebound collar 130 includes: the upper disk part 131 (see FIG. 2 or 3), which is an example of the flange, restricting movement of the rebound spring 110 toward the other (upper) side; and the recesses 131a (see FIG. 2 or 3) on the upper disk part 131, each of which is an example of the facilitating part, facilitating movement of the piston rod 20 in the circumferential direction.

In the rebound spring unit 100 of the first embodiment configured as above, the upper rebound collar 130 is fitted to the piston rod 20 so as to be movable relative to the piston rod 20, and the recesses 131a are formed on the upper surface of the upper disk part 131. This facilitates movement of the piston rod 20 in the circumferential direction and prevents plastic deformation of the rebound spring 110.

Figure 5:
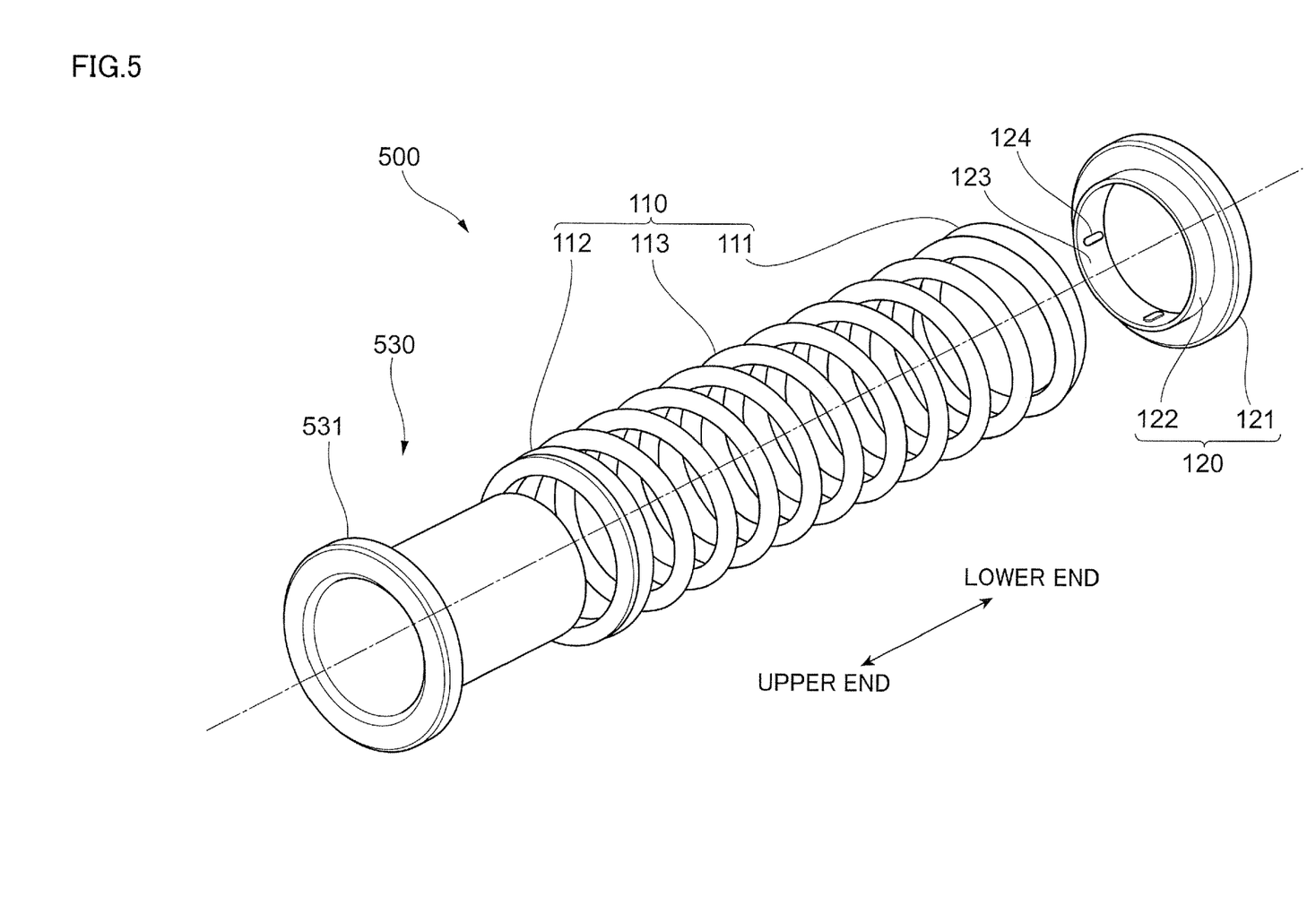
FIG. 5 illustrates a schematic configuration of a rebound spring unit of a comparative example.

FIG. 5 illustrates a schematic configuration of a rebound spring unit 500 of a comparative example.

The rebound spring unit 500 of the comparative example is different from the rebound spring unit 100 of the first embodiment in that the rebound spring unit 500 does not include the recesses 131a on the upper surface of the upper disk part 131 of the upper rebound collar 130. The upper rebound collar of the rebound spring unit 500 of the comparative example is denoted by the reference numeral 530, and the upper disk part is denoted by the reference numeral 531.

For example, when a wheel is rotated in a state where the vehicle main body is hoisted for replacement of a tire, the cylinder part 10 and the piston rod 20 relatively rotate about the axis with the maximum compressive load being applied to the rebound spring 110. In the rebound spring unit 500 of the comparative example, no recess is formed on the upper surface of the upper disk part 531 of the upper rebound collar 530. Thus, oil has less chance of entering in between the upper rebound collar 530 and the rod guide 14, and thus the upper rebound collar 530 rotates along with the cylinder part 10 due to contact pressure between the upper rebound collar 530 and the rod guide 14. Meanwhile, since the lower rebound collar 120 is press-fitted to the piston rod 20, the lower rebound collar 120 rotates along with the piston rod 20. As a result, the upper and lower ends of the rebound spring 110 may relatively rotate and twist with the maximum compressive load being applied to the rebound spring 110, and thus the rebound spring 110 may experience plastic deformation. Further, deformation of the rebound spring 110 may cause damage to the inner surface of the inner cylinder 12.

On the other hand, in the rebound spring unit 100 of the first embodiment, when the cylinder part 10 and the piston rod 20 relatively rotate about the axis with the maximum compressive load being applied to the rebound spring 110, the upper rebound collar 130 rotates (slides) relative to the rod guide 14. That is, the recesses 131a formed on the upper surface of the upper disk part 131 of the upper rebound collar 130 each function as an oil reservoir, and oil is supplied in between the upper surface of the upper disk part 131 and the rod guide 14. This makes the upper rebound collar 130 easily slidable (rotatable) relative to the rod guide 14. As a result, the upper and lower ends of the rebound spring 110 do not twist (relatively rotate) even when the maximum compressive load is applied to the rebound spring 110, whereby plastic deformation of the rebound spring 110 is prevented. This further prevents damage to the inner surface of the inner cylinder 12 due to deformation of the rebound spring 110.

The Lower Cylindrical Part 122 of the Lower Rebound Collar 120 and the Upper Cylindrical Part 132 of the Upper Rebound Collar 130

As described above, the lower rebound collar 120 and the upper rebound collar 130 are set to have a length such that the lower rebound collar 120 and the upper rebound collar 130 do not contact each other even when the rebound spring 110 is in the most contracted state. Further, when the rebound spring 110 is in the most contracted state (when the lower rebound collar 120 and the upper rebound collar 130 are closest to each other), a gap between the upper end of the lower cylindrical part 122 of the lower rebound collar 120 and the lower end of the upper cylindrical part 132 of the upper rebound collar 130 is set smaller than a wire diameter of the rebound spring 110. In other words, when the rebound spring 110 is in the most contracted state, a length of the piston rod 20 exposed between the lower rebound collar 120 and the upper rebound collar 130 is set smaller than a wire diameter of the rebound spring 110. This prevents damage to the outer surface of the piston rod 20 due to deformation of the rebound spring 110, even when the rebound spring 110 is in the most contracted state.

Figures 6A, 6B:
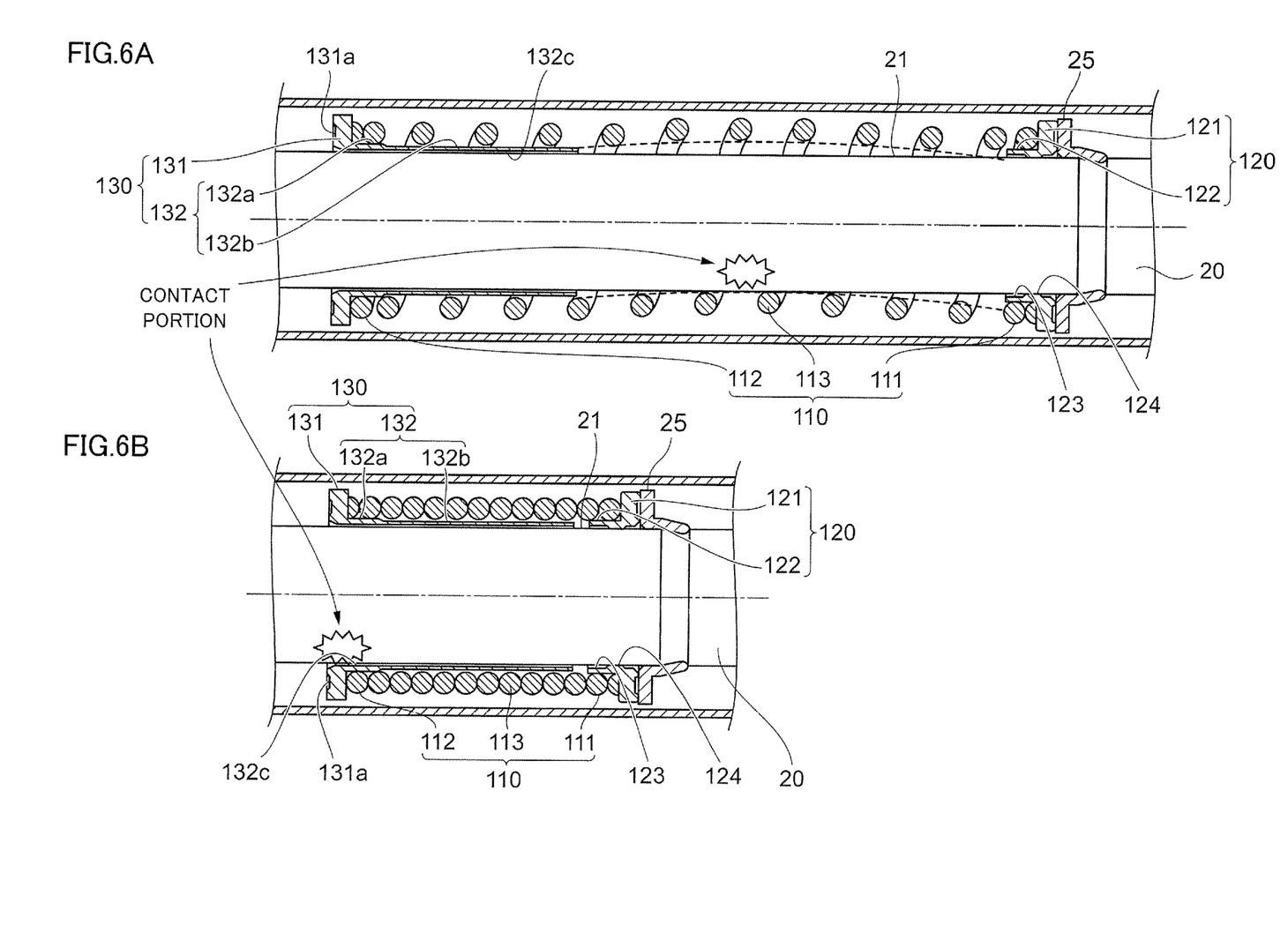
FIG. 6A illustrates a state where a rebound spring of the rebound spring unit of the first embodiment is bowing and FIG. 6B is a cross-sectional view of the rebound spring unit in a state where the projection amount of the piston rod is maximum.

FIG. 6A illustrates a state where the rebound spring 110 of the rebound spring unit 100 of the first embodiment is bowing. FIG. 6B is a cross-sectional view of the rebound spring unit 100 in a state where the projection amount of the piston rod 20 is maximum.

An axial length of the upper cylindrical part 132 of the upper rebound collar 130 is longer than an axial length of the lower cylindrical part 122 of the lower rebound collar 120. Accordingly, for example, even when the rebound spring 110 bows to contact the outer surface of the piston rod 20 with no compressive load being applied to the rebound spring 110, the contact portion is located close to the rebound seat 25, as shown in FIG. 6A. Further, as shown in FIG. 6B, when the projection amount of the piston rod 20 is maximum, the contact portion with the outer surface of the piston rod 20 is located at the same position as the upper rebound collar 130 (namely located below the rod guide 14). That is, even when the contact portion on the outer surface of the piston rod 20 is damaged, this contact portion does not pass by the oil seal 16, which is located above the rod guide 14. As a result, this can prevent damage to the oil seal 16 caused by the damage on the outer surface of the piston rod 20.

Modified Examples of the Upper Rebound Collar 130

Figure 7A:
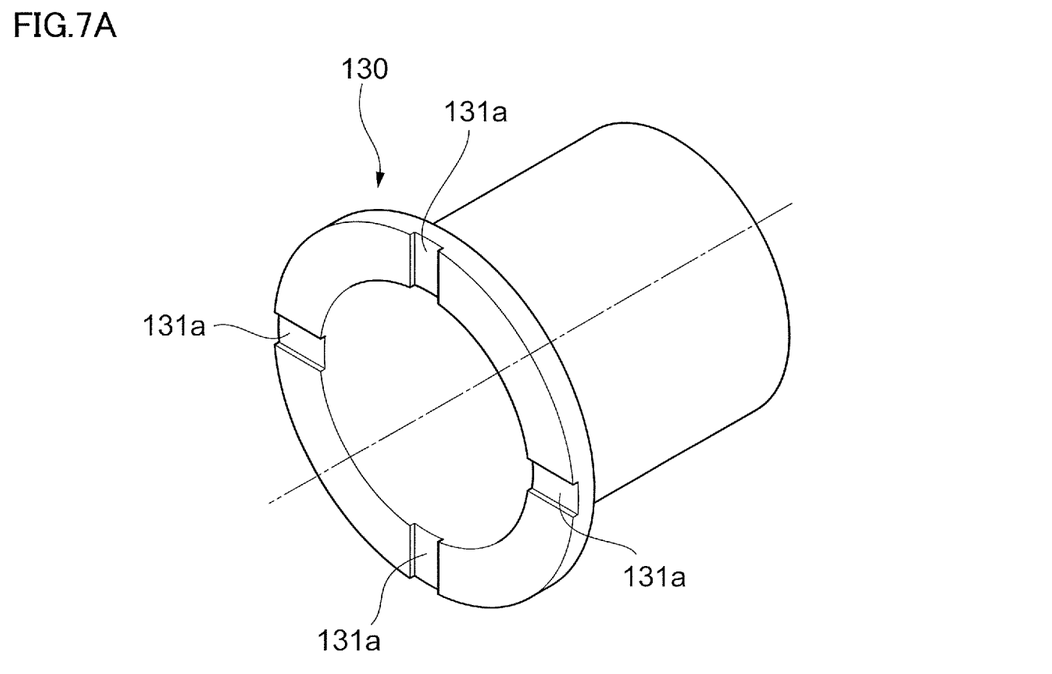
FIGS. 7A and 7B each illustrate a modified example of an upper rebound collar.
Figure 7B:
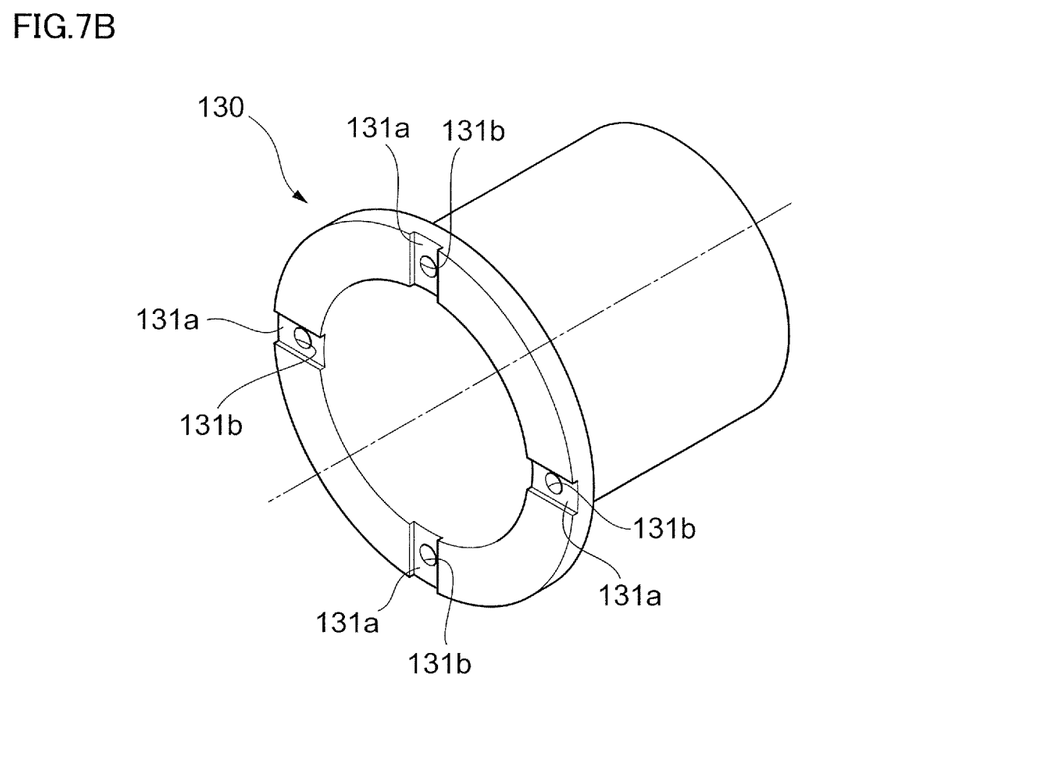

FIGS. 7A and 7B each illustrate a modified example of the upper rebound collar 130.

The shape of the recess 131a formed on the upper disk part 131 of the upper rebound collar 130 is not limited to a hemispherical shape or a trapezoidal cross-section. For example, as shown in FIG. 7A, the recess 131a may be a groove formed in a radial direction. The recess 131a of this or any other shape functions as an oil reservoir that allows oil to be supplied in between the upper surface of the upper disk part 131 and the rod guide 14, making the upper rebound collar 130 easily slidable relative to the rod guide 14. As a result, the upper and lower ends of the rebound spring 110 hardly twist even with the maximum compressive load being applied to the rebound spring 110, and thus plastic deformation of the rebound spring 110 may be prevented. This further prevents damage to the inner surface of the inner cylinder 12 due to deformation of the rebound spring 110.

Further, a through-hole 131b penetrating the upper disk part 131 of the upper rebound collar 130 may be formed in the upper disk part 131 so as to communicate with the recess 131a. When oil retained in the recess 131a reduces by being supplied in between the upper surface of the upper disk part 131 and the rod guide 14, the recess 131a is supplied with oil via the through-hole 131b. As a result, this can prevent plastic deformation of the rebound spring 110 and damage to the inner surface of the inner cylinder 12, even when the cylinder part 10 and the piston rod 20 relatively rotate about the axis with the maximum compressive load being applied to the rebound spring 110 for a long period.

Second Embodiment

Figure 8:
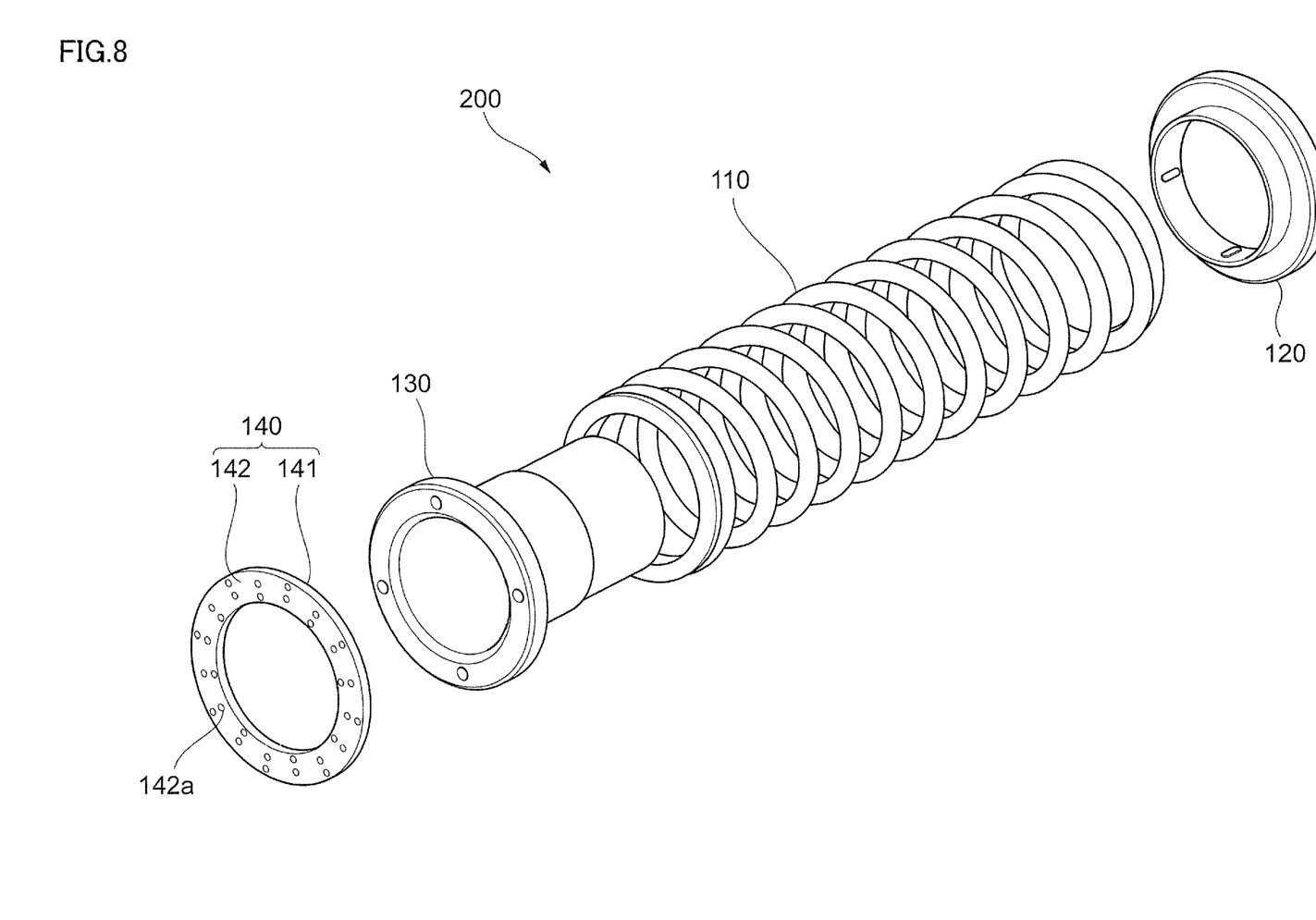
FIG. 8 illustrates a schematic configuration of the rebound spring unit of the second embodiment.

FIG. 8 illustrates a schematic configuration of the rebound spring unit 200 of the second embodiment.

Figures 9A, 9B:
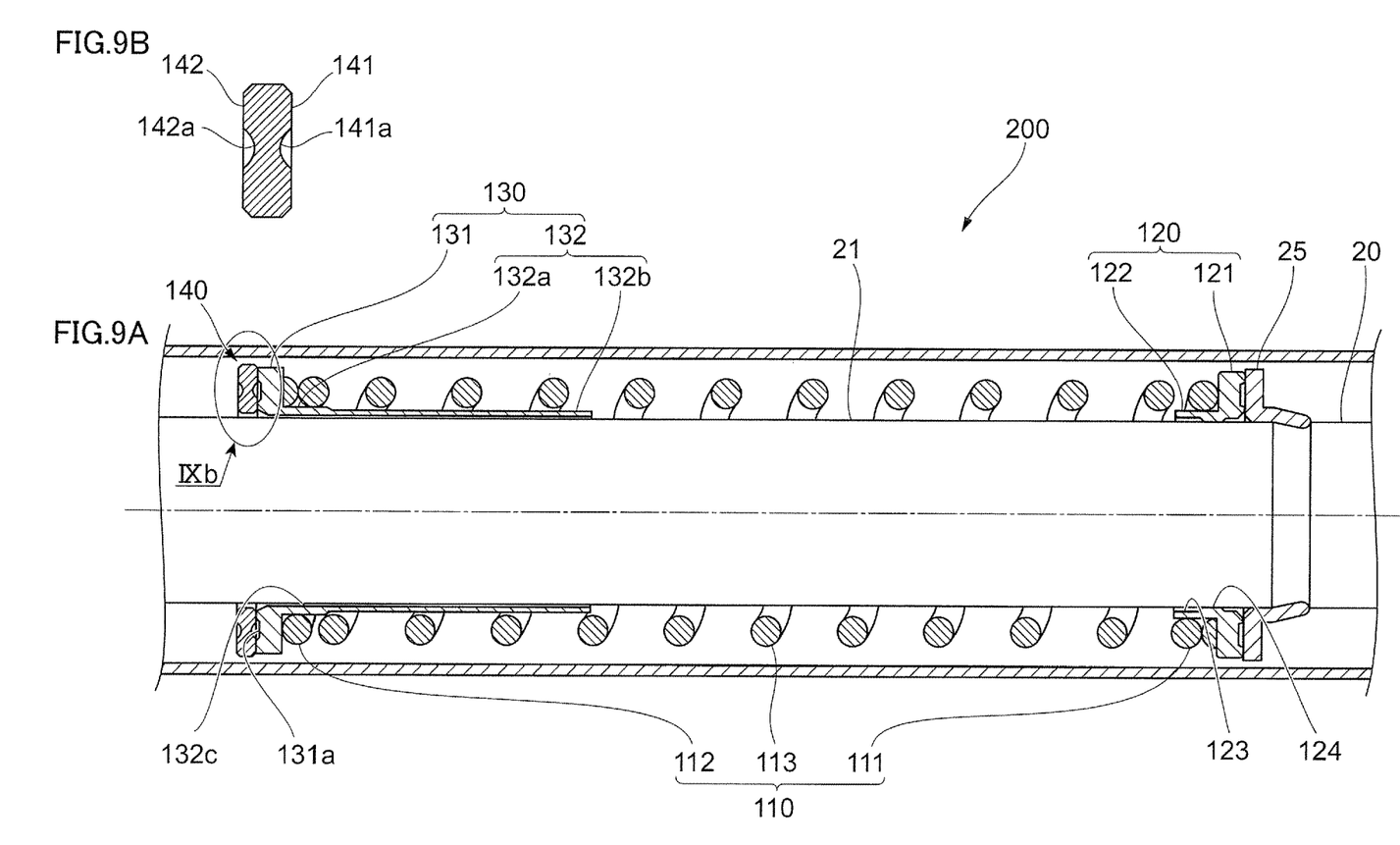
FIG. 9A is a cross-sectional view of the rebound spring unit of the second embodiment and FIG. 9B is an enlarged view of the part IXb in FIG. 9A.

FIG. 9A is a cross-sectional view of the rebound spring unit 200 of the second embodiment. FIG. 9B is an enlarged view of the part IXb in FIG. 9A.

The rebound spring unit 200 of the second embodiment is different from the rebound spring unit 100 of the first embodiment in that a thrust washer 140 is disposed between the upper rebound collar 130 and the rod guide 14.

The rebound spring unit 200 of the second embodiment includes the thrust washer 140, which is an example of the intervening member, intervening between the upper rebound collar 130 and the rod guide 14 such that the thrust washer 140 is movable relative to the piston rod 20 in the axial and circumferential directions.

The thrust washer 140 is a disk-like member having a through-hole in its central portion to allow for insertion of the piston rod 20. The thrust washer 140 includes a lower surface 141 contacting the upper rebound collar 130 and an upper surface 142 contacting the rod guide 14. The lower surface 141 includes multiple lower recesses 141a receding from the lower surface 141 and arranged at equal intervals in the circumferential direction. The upper surface 142 includes multiple upper recesses 142a receding from the upper surface 142 and arranged at equal intervals in the circumferential direction. Each lower recess 141a and each upper recess 142a is formed in a hemispherical shape.

The thrust washer 140 is formed of resin having self-lubricity. For example, the thrust washer 140 is formed of a material having a higher self-lubricity than a material of the upper rebound collar 130. Examples of materials for the upper rebound collar 130 include nylon 66 (polyamide 66) of polyamide synthetic resin, and examples of materials for the thrust washer 140 include fluororesin such as Teflon®, PFA and tetrafluoride resin, and polyacetal (POM).

In the rebound spring unit 200 of the second embodiment configured as above, the thrust washer 140 intervenes between the upper rebound collar 130 and the rod guide 14 such that the thrust washer 140 is movable relative to the piston rod 20 in the circumferential direction. This prevents plastic deformation of the rebound spring 110.

That is, in the rebound spring unit 200 of the second embodiment, when the cylinder part 10 and the piston rod 20 relatively rotate with the maximum compressive load being applied to the rebound spring 110, the thrust washer 140 slides (rotates) relative to the rod guide 14. In other words, due to the thrust washer 140 being formed of resin having self-lubricity, the thrust washer 140 easily slides relative to the rod guide 14 even under force from the rebound spring 110. As a result, the upper and lower ends of the rebound spring 110 hardly twist even with the maximum compressive load being applied to the rebound spring 110, and thus plastic deformation may be prevented. This further prevents damage to the inner surface of the inner cylinder 12 due to deformation of the rebound spring 110.

Further, the upper recesses 142a formed on the upper surface 142 of the thrust washer 140 each function as an oil reservoir, and oil is supplied in between the upper surface 142 and the rod guide 14. This makes the thrust washer 140 easily slidable (rotatable) relative to the rod guide 14. As a result, this can prevent plastic deformation of the rebound spring 110 and damage to the inner surface of the inner cylinder 12.

Further, the lower recesses 141a formed on the lower surface 141 of the thrust washer 140 each function as an oil reservoir, and oil is supplied in between the lower surface 141 and the upper rebound collar 130. Also, the recesses 131a formed on the upper surface of the upper disk part 131 of the upper rebound collar 130 each function as an oil reservoir, and oil is supplied in between the upper surface of the upper disk part 131 and the thrust washer 140. This makes the thrust washer 140 and the upper rebound collar 130 easily slidable (relatively rotatable), preventing plastic deformation of the rebound spring 110 and damage to the inner surface of the inner cylinder 12.

Note that the recesses 131a are not necessarily formed on the upper surface of the upper disk part 131 of the upper rebound collar 130. This is because it is not necessary to facilitate sliding of the upper rebound collar 130 relative to the thrust washer 140 when the thrust washer 140 slides relative to the rod guide 14.

Modified Example of the Thrust Washer 140

FIGS. 10A to 10F each illustrate a modified example of the thrust washer 140.

Figure 10A:
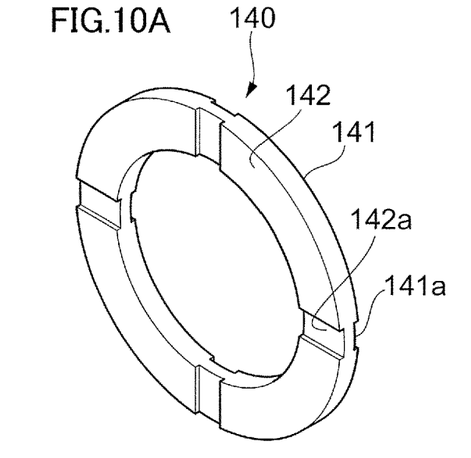
FIGS. 10A to 10F each illustrate a modified example of a thrust washer.

The shape of the lower recess 141a and the upper recess 142a formed on the thrust washer 140 is not limited to a hemispherical shape. For example, as shown in FIG. 10A, the lower recess 141a and the upper recess 142a may be a groove formed in a radial direction. The lower recess 141a and the upper recess 142a of this shape function as an oil reservoir that allows oil to be supplied in between the upper surface of the upper disk part 131 and the thrust washer 140 and in between the thrust washer 140 and the rod guide 14. This makes the upper rebound collar 130 easily slidable relative to the thrust washer 140 and makes the thrust washer 140 easily slidable relative to the rod guide 14. As a result, this prevents plastic deformation of the rebound spring 110 and damage to the inner surface of the inner cylinder 12.

Figure 10B:
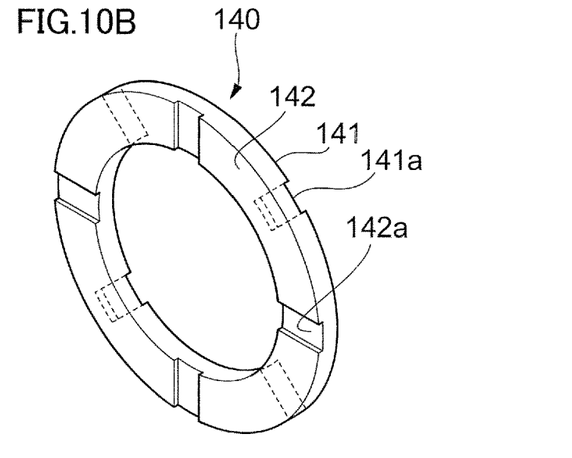

Note that the lower recesses 141a and the upper recesses 142a may be at the same positions (same phases) in the circumferential direction, as shown in FIG. 10A. Alternatively, the lower recesses 141a and the upper recesses 142a may be at different positions (different phases) in the circumferential direction, as shown in FIG. 10B.

Figure 10C:
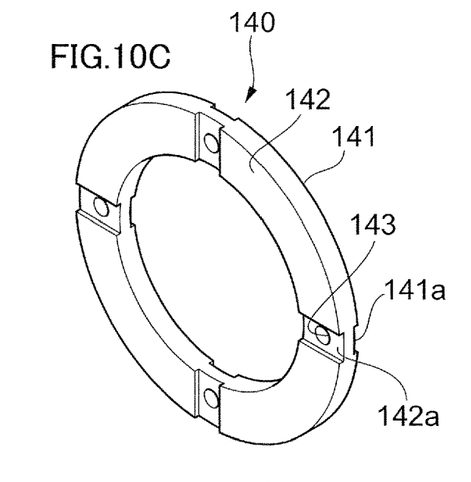

Further, when the lower recesses 141a and the upper recesses 142a are on the same phases, communication holes 143 may be formed in the thrust washer 140 so as to communicate with the respective lower recesses 141a and the respective upper recesses 142a, as shown in FIG. 10C. When oil retained in the upper recesses 142a reduces by being supplied in between the thrust washer 140 and the rod guide 14, the upper recesses 142a are supplied with oil via the respective communication holes 143. Further, when oil retained in the lower recesses 141a reduces by being supplied in between the thrust washer 140 and the upper rebound collar 130, the lower recesses 141a are supplied with oil via the respective communication holes 143. As a result, this can prevent plastic deformation of the rebound spring 110 and damage to the inner surface of the inner cylinder 12 over a long period.

Figure 10D:
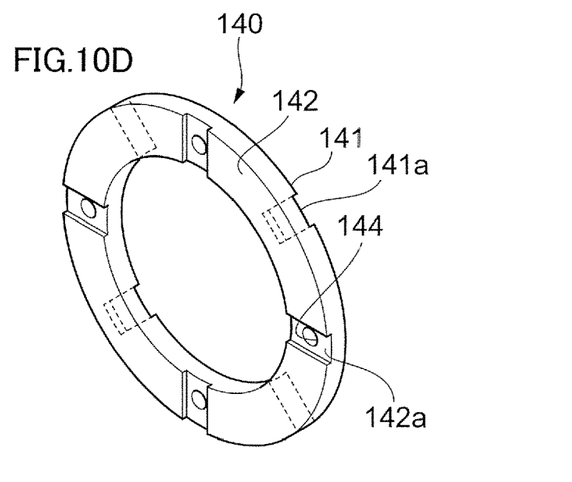

Alternatively, when the lower recesses 141a and the upper recesses 142a are on different phases, through-holes 144 penetrating the thrust washer 140 may be formed in the thrust washer 140 so as to communicate with the respective upper recesses 142a, as shown in FIG. 10D. When oil retained in the upper recesses 142a reduces by being supplied in between the thrust washer 140 and the rod guide 14, the upper recesses 142a are supplied with oil via the respective through-holes 144. As a result, this can prevent plastic deformation of the rebound spring 110 and damage to the inner surface of the inner cylinder 12 over a long period.

Figure 10E:
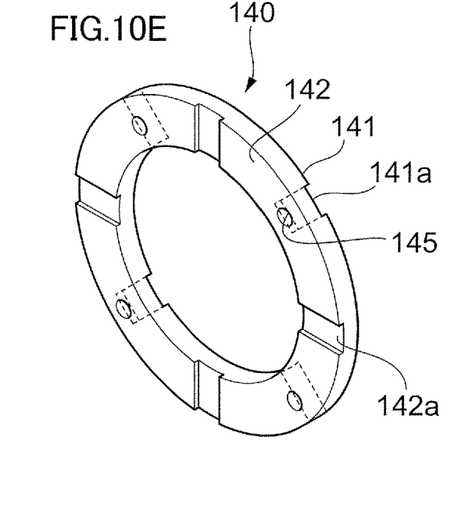

Alternatively, when the lower recesses 141a and the upper recesses 142a are on different phases, through-holes 145 penetrating the thrust washer 140 may be formed in the thrust washer 140 so as to communicate with the respective lower recesses 141a, as shown in FIG. 10E. When oil retained in the lower recesses 141a reduces by being supplied in between the thrust washer 140 and the upper rebound collar 130, the lower recesses 141a are supplied with oil via the respective through-holes 145. As a result, this can prevent plastic deformation of the rebound spring 110 and damage to the inner surface of the inner cylinder 12 over a long period.

Figure 10F:
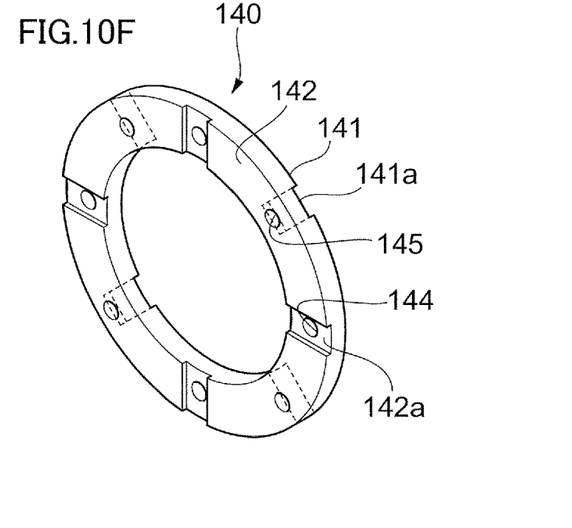

Alternatively, when the lower recesses 141a and the upper recesses 142a are on different phases, both of the aforementioned through-holes 144 and through-holes 145 may be formed in the thrust washer 140, as shown in FIG. 10F. When oil retained in the upper recesses 142a reduces by being supplied in between the thrust washer 140 and the rod guide 14, the upper recesses 142a are supplied with oil via the respective through-holes 144. And when oil retained in the lower recesses 141a reduces by being supplied in between the thrust washer 140 and the upper rebound collar 130, the lower recesses 141a are supplied with oil via the respective through-holes 145. As a result, this can prevent plastic deformation of the rebound spring 110 and damage to the inner surface of the inner cylinder 12 over a long period.

Figure 11:
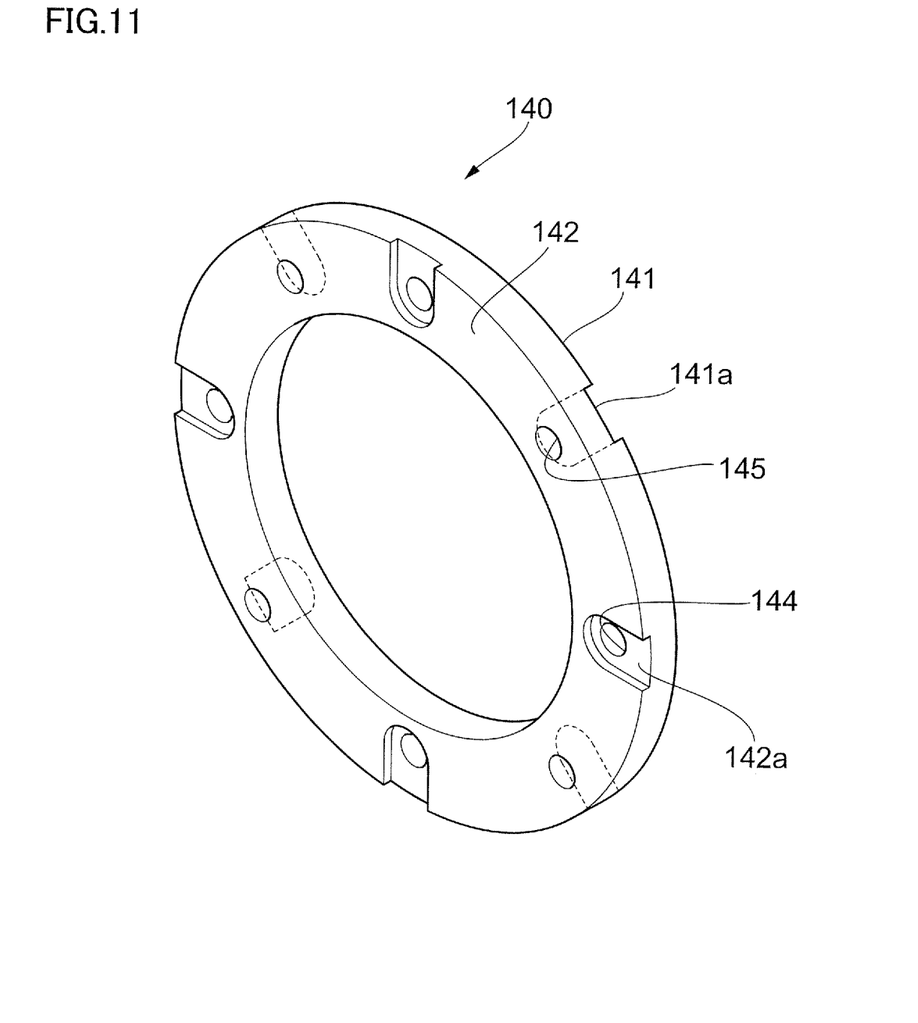
FIG. 11 illustrates another modified example of the thrust washer.

FIG. 11 illustrates another modified example of the thrust washer 140. The thrust washer 140 shown in FIG. 11 has the lower recesses 141a and the upper recesses 142a that are different in shape from those of the thrust washer 140 shown in FIG. 10F.

In modified examples of the thrust washer 140 explained with reference to FIGS. 10A to 10F, each of the lower recesses 141a and the upper recesses 142a does not need to extend from an inner edge to an outer edge of the thrust washer 140. For example, as shown in FIG. 11, one end in the radial direction of each of the lower recesses 141a and the upper recesses 142a may be arc-shaped. This shape also allows to prevent plastic deformation of the rebound spring 110 and damage to the inner surface of the inner cylinder 12.

REFERENCE SIGNS LIST

1 Suspension device
2 Hydraulic shock absorber
10 Cylinder part
20 Piston rod
25 Rebound seat
100 Rebound spring unit
110 Rebound spring
120 Lower rebound collar
130 Upper rebound collar
131 Upper disk part
131a Recess
140 Thrust washer
141a Lower recess
142a Upper recess

The invention claimed is:

1. A rebound spring structure comprising:
a spring;
a one-side holding member configured to hold an end on one side of the spring; and
an other-side holding member configured to hold an end on the other side of the spring, the rebound spring structure being positioned around a rod configured to move relative to a cylinder, wherein
the one-side holding member is held by the rod,
the other-side holding member is movably fitted to the rod, and
the other-side holding member includes a facilitating part at a flange of the other-side holding member, the flange being configured to restrict movement of the spring to the other side, the facilitating part being configured to facilitate movement of the other-side holding member in a circumferential direction of the rod, and
the facilitating part includes a plurality of recesses formed on a surface facing direct opposite to the spring, the plurality of recesses being configured to function as an oil reservoir in a state where a maximum compressive load is applied to the spring and being provided in a circumferential direction of the other-side holding member.

2. The rebound spring structure according to claim 1, wherein the facilitating part includes a hole penetrating the flange so as to communicate with the plurality of recesses.

3. The rebound spring structure according to claim 1, wherein the one-side holding member includes a one-side cylindrical part interposed between the rod and the spring,
the other-side holding member includes an other-side cylindrical part interposed between the rod and the spring, and
an axial length of the other-side cylindrical part is longer than an axial length of the one-side cylindrical part.

4. The rebound spring structure according to claim 1, wherein the plurality of the recesses are arranged at equal intervals.

5. The rebound spring structure according to claim 1, further comprising:
an intervening member intervening between the other-side holding member and a support member configured to movably support the rod at an end on the other side of the cylinder, the intervening member being movable in the circumferential direction relative to the rod.

6. The rebound spring structure according to claim 5, wherein
the intervening member includes an upper recess and a lower recess on a surface thereof, and
the upper recess and the lower recess are configured to retain oil therein in a state where the support member is in contact with the intervening member.

7. The rebound spring structure according to claim 6, wherein at least one of the upper recess and the lower recess includes a hole penetrating the intervening member.

8. The rebound spring structure according to claim 6, wherein the upper recess and the lower recess are respectively arranged at equal intervals.

9. A rebound spring structure comprising:
a spring positioned around a rod configured to move relative to a cylinder;
a one-side holding member configured to hold an end on one side of the spring, the one-side holding member being held by the rod;
an other-side holding member configured to hold an end on the other side of the spring, the other-side holding member being fitted to the rod so as to be movable relative to the rod; and
an intervening member intervening between the other-side holding member and a support member configured to movably support the rod at an end on the other side of the cylinder, the intervening member being movable in a circumferential direction relative to the rod, wherein
at least one of the other-side holding member and the intervening member includes a facilitating part configured to facilitate movement of the at least one of the other-side holding member and the intervening member in the circumferential direction of the rod,
the facilitating part includes a plurality of recesses formed on at least one of a surface facing direct opposite to the spring and a surface of the intervening member, a flange being provided to the other-side holding member and configured to restrict movement of the spring to the other side, and the plurality of recesses being configured to retain oil therein in a state where the support member is in contact with the intervening member and being provided in a circumferential direction of the other-side holding member.

10. The rebound spring structure according to claim 9, wherein the facilitating part includes a hole penetrating the flange or the intervening member so as to communicate with the plurality of recesses.

* * * * *